(12) United States Patent
Prince et al.

(10) Patent No.: US 7,832,689 B2
(45) Date of Patent: Nov. 16, 2010

(54) ELEMENT FOR GENERATING A FLUID DYNAMIC FORCE

(76) Inventors: Simon Andrew Prince, Centre for Aeronautics, City University, Northampton Square, London (GB) EC1V OHB; Vahik Khodagolian, Centre for Aeronautics, City University, Northampton Square, London (GB) EC1V OHB ( * ) Notice: Subject to any disclaimer, the term of this patent is extended or adjusted under 35 U.S.C. 154(b) by 488 days.

(21) Appl. No.: 11/995,440

(22) PCT Filed: Jul. 13, 2006

(86) PCT No.: PCT/GB2006/002596
§ 371 (c)(1),
(2), (4) Date: Jan. 11, 2008

(87) PCT Pub. No.: WO2007/007108
PCT Pub. Date: Jan. 18, 2007

(65) Prior Publication Data
US 2009/0173834 A1    Jul. 9, 2009

(30) Foreign Application Priority Data
Jul. 13, 2005   (GB) ................................. 0514338.3

(51) Int. Cl.
B64C 21/04    (2006.01)
(52) U.S. Cl. ................................. 244/200.1; 244/204.1
(58) Field of Classification Search ................. 244/198, 244/204, 207, 208, 209, 210, 200.1, 201, 244/204.1, 199.1, 87
See application file for complete search history.

(56) References Cited

U.S. PATENT DOCUMENTS 2,041,793 A * 5/1936 Stalker .................... 244/200.1
3,421,577 A * 1/1969 Valyi ......................... 165/170
7,143,983 B2 * 12/2006 McClure ..................... 244/204

FOREIGN PATENT DOCUMENTS

BE          358128       * 2/1929

OTHER PUBLICATIONS

Innes et al., "Improvements in the performance of a three element high lift system by the application of airjet vortex generators", The Aeronautical Journal, 99 (987), Sep. 1995.

* cited by examiner

*Primary Examiner*—Timothy D Collins
(74) *Attorney, Agent, or Firm*—Schneck & Schneck; Thomas Schneck

(57) ABSTRACT

This invention relates to an element (11) for generating a fluid dynamic force, the element (11) comprising first (13) and second (15) surfaces extending in opposite directions from a leading edge (17) of the element (11) and meeting at a trailing edge (18) thereof to define a three dimensional body that is shaped to generate a fluid dynamic force when immersed at an angle of attack $\alpha$ to a fluid flow over the element (11) in a flow direction U, the first surface (13) comprising an array of fluid inlets (19) and the second surface (15) comprising a corresponding array of fluid outlets (21), each said inlet (19) being fluidly coupled to a said outlet (21) by means of a fluid duct (23) at least part of which is pitched at an angle $\theta$ to a tangent plane (Y-Y) to said second surface (15) in the vicinity of said outlet (21) and skewed at an angle $\phi$ to said fluid flow direction U, the arrangement being such that the element (11) is operable in use to generate a relatively high fluid pressure region downstream of said leading edge (17) proximate said first surface (13) and a relatively low fluid pressure region downstream of said leading edge (17) proximate said second surface (15), and fluid from said relatively high fluid pressure region is enabled to flow into said fluid inlets (19) through said fluid ducts (23) and out of said fluid outlets (21) into said relatively low pressure region to generate fluid vortices which reenergise said low pressure region and delay boundary layer separation from said second surface (15).

25 Claims, 11 Drawing Sheets

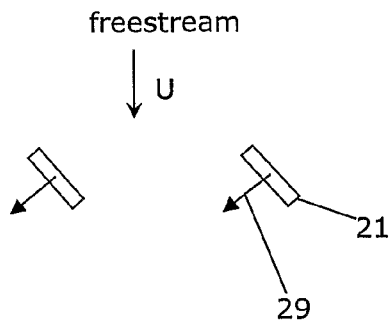
Fig. 3a(i)
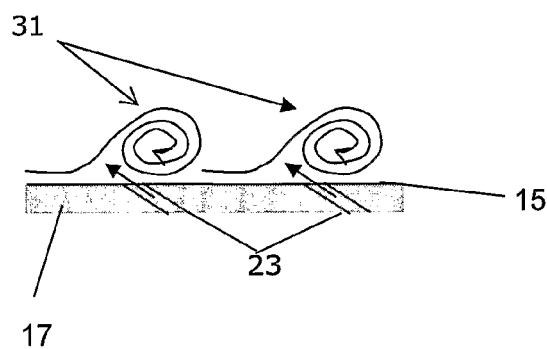
Fig. 3a(ii)
Fig. 3b(i)
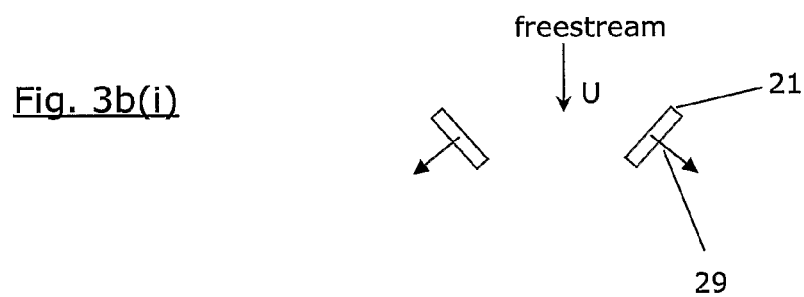
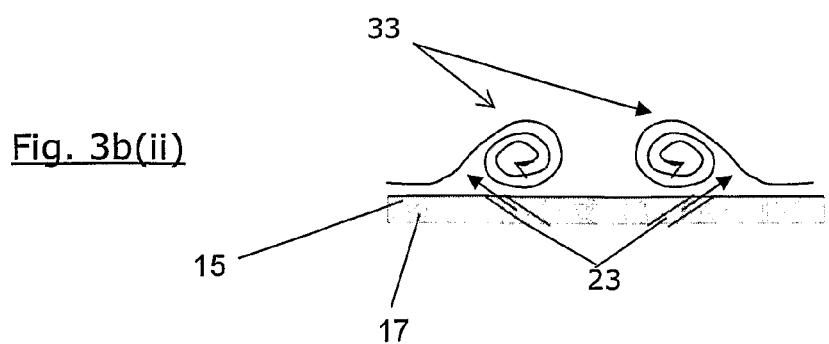
Fig. 3b(ii)

ELEMENT FOR GENERATING A FLUID DYNAMIC FORCE

FIELD OF THE INVENTION

This invention relates to an element for generating a fluid dynamic force when exposed to a fluid flow. In general terms the teachings of the present invention are universally applicable to any fluid dynamic force generating element, but in particularly preferred illustrative and non-limiting embodiments the element may comprise an aerofoil or a hydrofoil. In the context of this application, illustrative aerofoils include wings for fixed or rotating wing aircraft (e.g. an aeroplane or a helicopter), blades for wind turbine rotors and fans, and aircraft propeller blades; and illustrative hydrofoils include propeller blades and foils for hydrofoil boats.

BACKGROUND TO THE INVENTION

Referring now to FIG. 1a, fluid dynamic elements—in the context of the present invention—are three-dimensional bodies 1 comprising, in cross-section, first 3 and second 5 generally curved surfaces which extend in opposite directions from a leading edge 7 of the body 1 to meet at a trailing edge 9 of the body. The first and second surfaces have different curved profiles so that when the body is immersed in a fluid flow U at a positive angle of attack $\alpha$, the fluid divides at the leading edge and flows at different speeds over each of the first and second surfaces. The difference in fluid velocities over the first and second surfaces induces, following Bernoulli's principle, a pressure difference that generates a force, which for aircraft wings is the lift force, commonly normalised as a dimensionless lift coefficient $C_L$. The body also experiences a retarding force, called drag in the case of an aircraft wing, which can be normalised as a dimensionless drag coefficient, $C_D$.

In the context of an aircraft, air flows smoothly over both surfaces of the body (wing) in normal flight, and for powered flight the thrust force applied (typically by the engines of the aircraft) for a given angle of attack must be sufficient to generate a lift that exceeds the drag. A stall can occur when a critical angle of attack is exceeded, and in this condition the airflow separates from the uppermost surface of the wing causing a dramatic loss of lift and a large increase in drag. This phenomenon of flow separation is often referred to in the art as a "boundary layer flow separation", and is a phenomenon that is universally applicable to all types of elements that are capable of generating a fluid dynamic force when exposed to a fluid flow.

Boundary layer flow separation, namely the divergence of a flowing stream of fluid from a surface such as an aircraft helicopter wing or wind turbine rotor blades, can severely limit the operation, endurance, and performance of many engineering systems.

Boundary layer separation can be triggered and induced by several mechanisms. It can either be a natural consequence of the local flow and/or geometry, or be artificially induced by external disturbances and instabilities. On aero- or fluid-dynamic surfaces at high angle of attack to the oncoming air/fluid stream, the combination of adverse (increasing) pressure gradients from surface curvature, and the shear stresses between adjacent fluid layers and the surface, due to viscosity, can cause the air/fluid stream to separate from it. For aircraft wings and propeller and turbine rotor blades, flow separation results in a catastrophic loss of aerodynamic lift, a rapid increase in drag and a rapid increase in noise levels.

The development of techniques for the suppression, or delay to higher angle of attack, of flow separation on aircraft wings and rotor blades, has been a major research objective over the past 50 years. Flow separation due to surface curvature and viscosity can be delayed by the natural mixing in turbulent boundary layers. Turbulent flow embodies a relatively fast self-mixing and transport mechanism but it cannot transfer enough momentum into the boundary layer to maintain an attached flow in the presence of large adverse pressure gradients, such as on an aircraft wing or rotor blade pitched at high angle of attack.

Accordingly, and in order to prevent and delay the departure of the boundary layer from a surface, it has been proposed to utilise artificial flow mixing enhancement devices to re-energise the boundary layer. By re-energising the boundary layer to artificially increase the rate of fluid mixing within the boundary layer, one can increase the kinetic energy of the relatively low momentum near-surface fluid, and thereby delay to a higher angle of attack, or in some instances prevent the onset of flow separation.

Various flow control techniques, to reenergise boundary layers and thereby address flow separation, have been identified and successfully tested. For example, techniques such as slot blowing, tangential blowing, synthetic jets and vane vortex generators have previously been proposed. Of these, the method of increasing fluid mixing rates by the artificial generation of near surface longitudinal vortices has been found to be a particularly powerful technique. These vortices act to entrain high energy flow from an undisturbed outer fluid stream and transport it into a low momentum near-surface region deep inside the boundary layer. Mechanical, passive, vane vortex generators (first devised by Taylor, D. H., & Hoadley, H. H. and reported in "Application of vortex generator mixing principle to diffusers" Report R-15064-5, United Aircraft corporation, East Hartford, Conn., 1948) are the most common and widely used streamwise fluid vortex generators, and commonly consist of thin, protruding, solid strips fixed to the surface, usually located ahead of a region in which separated flow is likely to occur, at an angle to the oncoming flow.

However, whilst such devices resist the onset of flow separation it has been shown that mechanical vane type vortex generators also impose an increase in drag, caused by both the local pressure increase derived from the flow blockage by the device itself and by an increase in surface skin friction downstream of the device.

As an alternative to passive solid vane type vortex generators it has previously been proposed to provide an active fluid jet vortex-generating device (see Wallis, R. A., "The use of air jets for boundary layer control", Aeronautical Research Laboratories, Australia, Aero. Note no. 110, 1952). The arrangement proposed by Wallis used fluid injection via inclined surface-bounded jets (more commonly known as active jet vortex generators or AJVGs) to induce longitudinal vortices for flow control.

Such AJVG systems usually consist of an array of small orifices, opening to a surface and supplied by a pressurised fluid source to induce longitudinal, or streamwise, vortices by virtue of the interaction between the fluid jets issuing from each orifice and fluid moving along the surface. AJVGs avoid the principal problem associated with passive vane type vortex generators in that they do not cause a large increase in drag. AJVGs can also be actively operated and controlled, depending on the flow characteristics over the surface.

Active vortex generating jets have been investigated as potential flow control devices for suppressing or at least postponing aerodynamic stall in fixed wing aircraft (see, for example, Innes, F., Pearcey, H. H., and Sykes, D. M., "Improvements in performance of a three element high lift system by application of air jet vortex generators", The Aeronautical Journal, Vol 99, No 987, 1995), and more recently on rotating wing aircraft. AJVGs have proved to be successful in suppressing and delaying stall in laboratory wind tunnel experiments, and FIG. 1(b) is a graph illustrating the experimentally measured variation in lift coefficient ($C_L$) with angle of attack (a) for an aerofoil wing section with and without AJVGs. The graph and accompanying schematic diagrams of illustrative aerofoils (at a 16° angle of attack) with and without AJVGs, show that flow separation (indicated by S in schematic) is delayed to higher angle of attack using AJVGs, and that consequently, a higher maximum value of $C_L$ can be achieved before stall.

However, whilst active vortex generating jets have been shown to provide performance enhancements, they have not yet been embraced by the engineering community, and passive vane type vortex generators are still commonly used on aircraft wings, despite their inherent drag increasing properties.

A likely explanation for this is that whilst AJVGs do provide performance advantages, they also require external energy input to generate the pressurised fluid for the fluid jets and the equipment required to provide this energy input greatly increases the overall weight of, for example, the aircraft. It is also the case that installation of an active system is inherently much more complex and hence costly than a simple vane vortex generator array.

It is apparent, therefore, that it would be highly advantageous if it were possible to design a fluid dynamic force generating element which avoided or at least reduced the increase in drag that characterises previously proposed vane-type passive vortex generators as well as the inherent disadvantages associated with previously proposed AJVGs, whilst at the same time providing comparable performance enhancements to those provided by the previously proposed AJVG systems.

SUMMARY OF THE INVENTION

An aim of the present invention has been to seek to provide a fluid dynamic force generating element which embodies the advantages associated with AJVG systems without exhibiting, or at least exhibiting to a lesser degree, the disadvantages associated with previously proposed passive systems.

To this end, a presently preferred embodiment of the present invention provides an element for generating a fluid dynamic force, the element comprising first and second surfaces extending in opposite directions from a leading edge of the element and meeting at a trailing edge thereof to define a three dimensional body that is shaped to generate a fluid dynamic force when immersed at an angle of attack a to a fluid flow over the element in a flow direction U, the first surface comprising an array of fluid inlets and the second surface comprising a corresponding array of fluid outlets, each said inlet being fluidly coupled to a said outlet by means of a fluid duct at least part of which is pitched at an angle θ to a tangent plane to said second surface in the vicinity of said outlet and skewed at an angle ϕ to said fluid flow direction U, the arrangement being such that the element is operable in use to generate a relatively high fluid pressure region downstream of said leading edge proximate said first surface and a relatively low fluid pressure region downstream of said leading edge proximate said second surface, and fluid from said relatively high fluid pressure region is enabled to flow into said fluid inlets through said fluid ducts and out of said fluid outlets into said relatively low pressure region to generate fluid vortices which reenergise said low pressure region and delay boundary layer separation from said second surface.

In a highly preferred arrangement the inlets have a larger cross-sectional area than said outlets, and said fluid ducts decrease in cross-sectional area from a said inlet to a said outlet to accelerate fluid flowing therethrough.

The pitch angle θ may be between about 15° to 45°, preferably approximately 30°. The skew angle ϕ may be between about 30° to 90°, preferably between 60° to 70°. In a highly preferred arrangement, the skew angle is in an inbound direction away from a tip of the element.

In a preferred embodiment, the element has a length, and said outlet array is arranged to follow a spanwise line (J-J) along the length of the element.

Preferably, a ratio at discrete locations along said length of a distance x between said leading edge and said spanwise line (J-J) and a distance C corresponding to the width of the element is substantially constant along the length of the element In one embodiment said ratio x/C is greater than zero and less than 0.4

In another embodiment, said ratio x/C is between about 0.1 and 0.3.

Preferably, said fluid flows out of said outlets as a plurality of fluid jets. In one embodiment, respective pairs of inlets, outlets and ducts are arranged such that fluid jets emerging therefrom form counter-rotating fluid vortices. In another embodiment, said inlets, outlets and ducts are arranged such that fluid jets emerging therefrom form co-rotating fluid vortices.

The inlets, outlets and ducts may have a circular, elliptical, square or rectangular cross-section.

Preferably, said inlets, outlets and said ducts have a circular cross-section, and adjacent outlets are spaced by a distance ΔL substantially equal to between 6 to 10 times each outlet diameter, and optionally each outlet may have a diameter substantially equal to about 0.5 to 1.0 times a height of a local undisturbed boundary layer thickness.

In another arrangement, said inlets, outlets and ducts may have a square or rectangular cross-section, and adjacent outlets may be spaced by a distance ΔL substantially equal to between 6 to 10 times a longest side of each said outlet. Optionally, said inlets, outlets and ducts have a square or rectangular cross-section, and each outlet has a width or longest side that is substantially equal to about 0.5 to 1.0 times a height of a local undisturbed boundary layer thickness.

In a highly preferred embodiment, the element has a length, and said inlets are located to coincide with the location of a notional stagnation line along the length of the element first surface.

Preferably said stagnation line corresponds to a point of greatest static fluid pressure on said first surface at a particular angle of attack α at which boundary layer separation on said second surface begins to progress upstream towards said leading edge.

Preferably said inlets are smoothly profiled to avoid inducing boundary layer separation. Preferably said ducts are substantially straight.

The ducts may include a non-return valve (such as a bi- or tri-cuspid valve) to prevent fluid flow into said outlets through said ducts and out of said inlets. One or more of the ducts may include a swirl generator to induce a pre-swirl in fluid passing therethrough.

A particularly preferred embodiment of the present invention relates to a wing, wing section or other lift promoter for a fixed wing aircraft comprising an element having one or more of the features described herein. Such promoters may comprise high lift devices such as flaps or slats—the like of which are well known to persons of ordinary skill in the art.

Another particularly preferred embodiment of the present invention relates to a wind turbine comprising a plurality of blades, one or more of which comprise an element having one or more of the features described herein.

Yet another particularly preferred embodiment of the present invention relates to a rotor blade for a rotating wing aircraft such as a helicopter comprising an element having one or more of the features described herein.

Another embodiment of the present invention relates to an element configured for use as a wing or wing section of a fixed wing aircraft, a blade for a wind turbine, or a rotor blade for a rotating wing aircraft; the element having a length and a width C and comprising: first and second surfaces extending in opposite directions from a leading edge of the element and meeting at a trailing edge thereof to define a three dimensional body that is shaped to generate a fluid dynamic force when immersed at an angle of attack a to a fluid flow over the element in a flow direction U; said first surface comprising an array of fluid inlets located to coincide with a notional stagnation line along the length of the element first surface, said second surface comprising a corresponding array of fluid outlets which is arranged to follow a spanwise line (J-J) along the length of the element, a ratio at discrete locations along said length of a distance x between said leading edge and said spanwise line (J-J) and a distance C corresponding to the width of the element being substantially constant along the length of the element, each said inlet being fluidly coupled to a said outlet by means of a fluid duct pitched at an angle $\theta$ between about 15° to 45° to a tangent plane (Y-Y) to said second surface in the vicinity of said outlet and skewed at an angle $\phi$ between about 30° to 90° to said fluid flow direction U, said fluid duct decreasing in cross-sectional area from said inlet to said outlet to accelerate fluid flowing therethrough; the arrangement being such that the element is operable in use to generate a relatively high fluid pressure region downstream of said leading edge proximate said first surface and a relatively low fluid pressure region downstream of said leading edge proximate said second surface, and fluid from said relatively high fluid pressure region is enabled to flow into said fluid inlets through said fluid ducts and out of said fluid outlets into said relatively low pressure region to generate a plurality of co-rotating fluid vortices which reenergise said low pressure region and delay boundary layer separation from said second surface.

In accordance with another presently preferred embodiment of the present invention there is provided a hydro- or aero- dynamic body operable to generate a region of high fluid pressure adjacent a first surface and a region of low fluid pressure adjacent a second surface when said body is arranged at an angle of attack to an incident fluid flow, the body including a plurality of ducts, pitched and skewed relative to said fluid flow, extending from said high pressure surface to said low pressure surface to enable the formation of a plurality of fluid jets extending from said ducts to form fluid vortices that reenergise said low pressure region and delay boundary layer separation from said low pressure surface.

Numerous other embodiments, features of those embodiments and advantages thereof will become apparent from the following detailed description of certain preferred embodiments of the present invention.

BRIEF DESCRIPTION OF THE DRAWINGS

Various presently preferred embodiments of the invention are described hereafter, by way of illustrative example only, with reference to the accompanying drawings, in which:

FIG. 2b is a cross-sectional view of a wing section along the line X-X in FIG. 2a;

FIGS. 3(a)(i) and (ii) are plan and cross-sectional representations of a first outlet arrangement;

FIGS. 3(b)(i) and (ii) are plan and cross-sectional representations of a second outlet arrangement;

DETAILED DESCRIPTION OF PREFERRED EMBODIMENTS

As will hereafter be described in detail, we have developed a fluid dynamic force generating element with passive fluid jet vortex generators which retains the low drag properties of elements with AJVGs, but uses a natural process to generate fluid jets and hence requires no active energy input or associated bulky fluid pressurisation equipment. The element that we have developed makes use of the natural pressure difference in a fluid flow over a fluid dynamic force generating element, which difference occurs between a high fluid pressure region in the vicinity of the (typically) lower surface of the element downstream of the leading edge, and a low fluid pressure region in the vicinity of the (typically) upper surface of the element downstream of the leading edge.

In a preferred embodiment of the invention, fluid from the high pressure region is injected into the low pressure region to reenergise that low pressure region and hence delay the onset of boundary layer separation from the surface of the element proximate that region. In the preferred embodiment, fluid is inducted through contoured intakes located in the (typically) lower surface downstream of the leading edge, and is passed though pitched and skewed ducts to outlet orifices located in the (typically) upper surface to generate a plurality of relatively high velocity, high pressure fluid jets which are injected into the low pressure region to reenergise the boundary layer and hence delay boundary layer flow separation. In particular, when the element of the preferred embodiment is immersed in a fluid flow, a plurality of fluid jets emerge from the outlets and interfere with fluid flowing over the second (typically) upper surface to form a plurality of longitudinal fluid vortices which act to reenergize the retarded lower regions of the fluid boundary layer and hence delay the onset of boundary layer separation.

The major benefits of the element that we have developed as compared to elements with AJVGs, are simplicity, system reliability and passive energy transfer instead of active energy input.

Figure 1A:
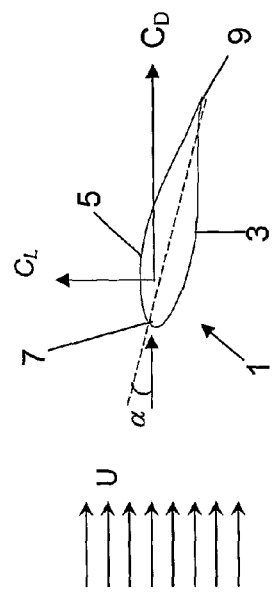
FIG. 1a is a schematic representation of an aerofoil section immersed in a fluid flow.
Figure 1B:
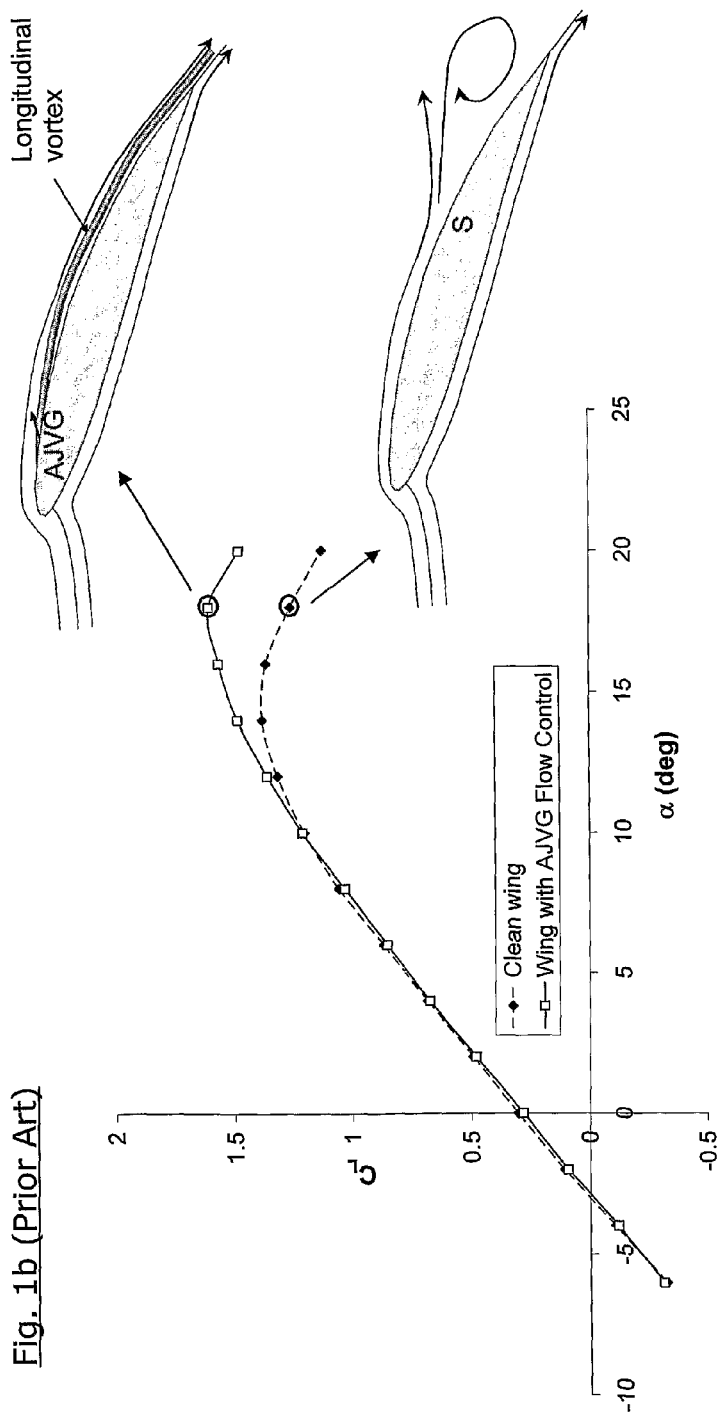
FIG. 1b is a graph of lift coefficient $C_L$ versus angle of attack for aerofoil wing sections with and without AJVG's, and accompanying schematic representations of the aforementioned wing sections at an angle of attack of 16°.
Figure 2A:
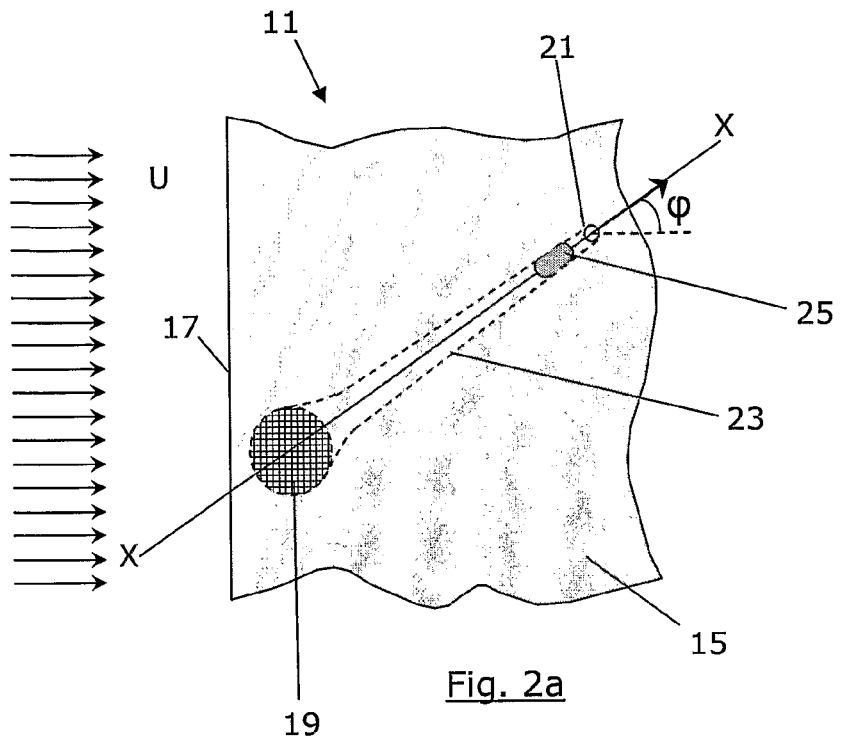
FIG. 2a is a representative aerofoil wing section embodying the teachings of the present invention.
Figure 2B:
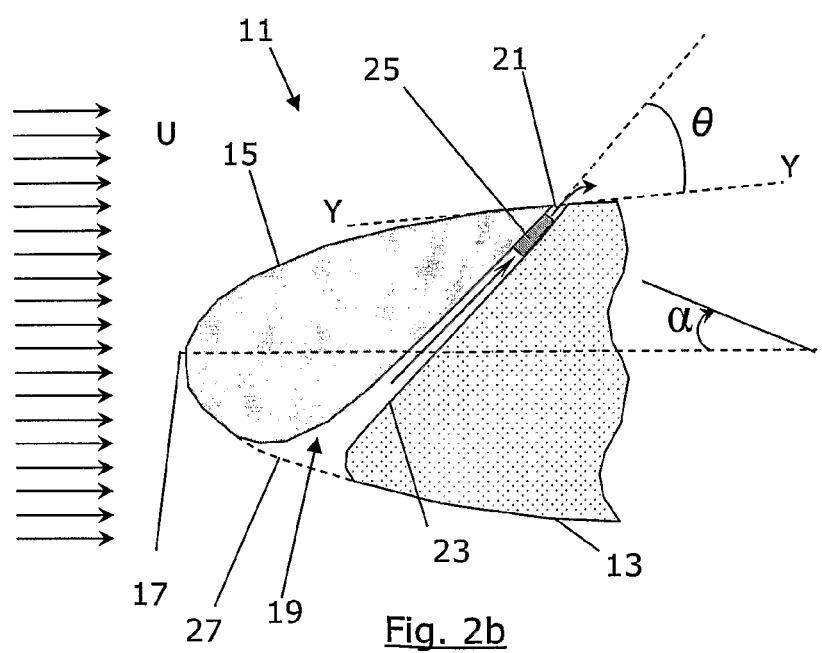

Referring now to FIGS. 2(a) and (b) of the accompanying drawings (where FIG. 2(b) is a cross-sectional representation along the line X-X in FIG. 2(a)), there is shown a fluid dynamic force generating element 11 according to a preferred embodiment of the present invention. In the particular example described hereafter, the element comprises a section of aerofoil suitable for use as part of a fixed wing aircraft wing. It will be appreciated, however, that the teachings of the present invention are applicable to all types of fluid dynamic force generating elements, and as such that the following description should not be interpreted as limiting the scope of the present invention only to aerofoils immersed in an airflow.

Figure 4:
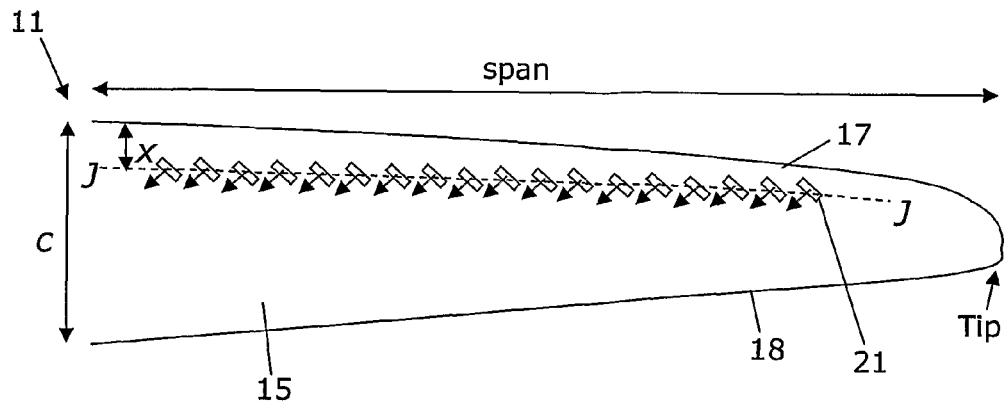
FIG. 4 is a schematic representation of an array of passive fluid jet vortex generator outlets on the upper surface of a typical wind turbine blade.

The element 11 comprises first 13 and second 15 surfaces, which extend in opposite directions from a leading edge 17 to meet at a trailing edge 18 (FIG. 4). The first and second surfaces are curved, typically with different radii of curvature, and the element is arranged in use at an angle of attack a to the incident flow direction U so that the incident fluid flows at different velocities over the two surfaces and hence generates different fluid pressures in the vicinity of those surfaces.

The first surface 13 is proximate a high fluid pressure region in the incident air flow (typically this surface is the lowermost surface when the element comprises a section of aircraft wing), and includes a plurality of fluid inlets 19 (one of which is shown). The second surface 15 is proximate a low fluid pressure region in the incident air flow (typically this surface will be the uppermost surface when the element comprises a section of aircraft wing), and includes a plurality of corresponding fluid outlets 21 (one of which is shown) fluidly coupled to respective fluid inlets by a fluid duct 23.

As shown in FIG. 2(b), the duct 23 is pitched at an angle θ to a tangential surface plane Y-Y in the vicinity of the outlet 21. The duct is also skewed by an angle φ to the direction U of incident fluid flow, as illustrated in FIG. 2(a).

For applications where flow in the reverse direction (from the outlet to the intake) may take place (for example at negative angles of attack of a wing or a blade) a flowback prevention valve 25 may be employed to prevent this from occurring. This device is not required, however, in cases where flow in the reverse direction should rarely/never occur (for example if the element comprises an aircraft wing or a wind turbine blade).

The inlet 19 may include a filter mesh 27 to cover the intake and prevent particulate contaminants from entering the fluid duct 23 and blocking it, and in the preferred arrangement the mesh is shaped smoothly to follow the contour of the first surface 13.

In the preferred embodiment, the fluid duct 23 is (as shown) substantially straight so as to avoid obstructing, and hence reducing the velocity of fluid flow from the inlet to the outlet. In a particularly preferred arrangement, the inlet 19 has a larger cross-sectional area than the corresponding outlet 21, and the duct has a reducing cross-sectional area in a direction from the inlet to the outlet so that fluid entering the inlet is accelerated through the duct to the outlet.

The fluid duct may, however, be curved if such a configuration is necessary to achieve the correct pitch and skew angle of the fluid jet outlet in the second surface and in this instance only a portion of the duct in the vicinity of the outlet may have the skew and pitch angles hereafter described. The inlet, duct and outlet may have a circular cross-sectional shape (as shown), or alternatively they may be ovoid, rectangular or square in cross-section.

The duct may also include a swirl generator, for example of the type used in the injection manifold of an internal combustion engine fuel injection system, to provide the fluid jet with pre-swirl. This will improve the performance of the passive fluid jet vortex generators by more efficient longitudinal vortex formation downstream of the fluid jet.

As aforementioned, the pitch angle θ is measured relative to the local surface tangent (plane Y-Y in FIG. 2(b)) in the vicinity of the outlets, and in a particularly preferred embodiment is in the region of approximately 15° to 45° to the local surface tangent. In one arrangement that is well suited for low speed incompressible flows the pitch angle may be about 30°.

In a preferred embodiment the skew angle φ (FIG. 2(a)) of the fluid duct 23 (or as aforementioned at least a portion of the duct in the vicinity of the outlet), measured relative to the direction U of incident flow (otherwise defined as the velocity vector at the edge of the local undisturbed (solid surface) boundary layer), is in the region of approximately 30° to 90°. In one arrangement that is well suited for low speed incompressible flows the skew angle is in the region of 60° to 70°. Low speed flows, as is well understood by persons of ordinary skill in the art, are generally flows of less than Mach 0.3, which for air is 100 m/s or so.

Referring now to FIG. 4, and as aforementioned, it is preferred for the second surface 15 to include a plurality of outlets 21, and it is particularly preferred that those outlets are provided in an array which is arranged to follow a spanwise line J-J along the length of the element 11. In the preferred embodiment, the ratio of a distance x between the leading edge 17 and line J-J and a distance C corresponding to the width (chord) of the element should be constant along the length of the element, and in a particularly preferred arrangement x/C should be greater than zero and less than 0.4. For wings and blades, it has been found most effective for the outlets to be located at a chordwise location (x/C) along the element where x/C is between about 0.1 and 0.3 depending on the cross-sectional shape of the element. For a thinner aerofoil section (for example, sections with a thickness to chord ratio of 20% or less), x/C should preferably be equal to roughly 0.1, whereas for thicker aerofoil sections (for example, sections with a thickness to chord ratio of more than 20%) x/C should be closer to 0.3. The arrangement shown in FIG. 4 is particularly well suited for a wind turbine rotor blade, but the principles mentioned above apply equally to swept-back wings for fixed wing aircraft and blades for rotating wing aircraft. For rotating blades (for example, of a helicopter or wind turbine) and swept aircraft wings where significant spanwise flow is known to exist, the outlets should be arranged to provide a skew angle in an inboard direction (i.e. in a direction away from the tip) as shown in FIG. 4.

Again as aforementioned, the first surface 13 includes a plurality of inlets 19 arranged in an array. In the preferred embodiment, the inlets are located to coincide with the location of a so-called stagnation or attachment line along the length (spanwise) of the element first surface 13. The stagnation or attachment line corresponds to a point of greatest static fluid pressure on the body surface (in this instance the first surface 13) at a particular angle of attack α at which boundary layer separation on the surface on which flow is to be controlled (in this instance the second surface 15) begins to progress upstream. In very general terms, for aerofoil sections that we have investigated, the ratio of the distance between the leading edge and the attachment line to the chord length of the aerofoil section tends to be in the region of 5% or so.

By adopting this approach it is possible to provide for a natural regulation of the strength of fluid jets from the outlets to limit the disturbance caused by the fluid jets in conditions when they will not be as effective and are usually not required (for example, conditions such as low angles of attack in the case of aerodynamic wings and blades in incompressible flows). The beauty of this arrangement is that as the angle of attack decreases so the attachment line moves downstream from the leading edge so that the inlets are coincident with regions of the flow that exhibit a lower static fluid pressure, and hence the strength of the jets from the ducts (and by association the extent to which those jets disturb the flow over the second surface) decreases. In effect, by adopting this arrangement the element becomes self-regulating in that the inlets only have a significant effect at angles of attack where boundary layer separation would otherwise occur.

FIG. 3a(i) is a plan view of two outlets of the array depicted in FIG. 4, and FIG. 3(a)(ii) is a downstream view of the element from in front of the leading edge 17. As shown in FIG. 3a(i), the outlets of this embodiment are arranged so that the fluid jets 29 emerge from the second surface in parallel to form co-rotating longitudinal vortices 31 as depicted in FIG. 3a(ii). In an alternative embodiment depicted in FIGS. 3(b)(i) and (ii), the outlets may be arranged so that the fluid jets 29 emerge from the second surface in opposite directions to form counter-rotating longitudinal vortices 33 (as depicted in FIG. 3b(ii)). Both designs can be effectively employed but the counter-rotating system can be less effective in the case of a swept back wing, or on a rotating blade.

For circular cross-section ducts it is preferred for the outlets to have a diameter, or in the case of a rectangular duct a width or longest side length, which is roughly about 0.5 to 1.0 times the height of the local undisturbed boundary layer thickness. For example, for the NAC023012C blade section mentioned hereafter, the boundary layer is in the region of 5 mm high and the outlets have a diameter of roughly 4.8 mm.

Figure 5:
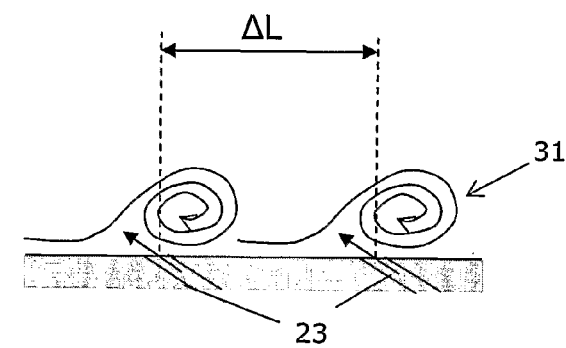
FIG. 5 is a schematic representation of a pair of passive fluid jet vortex generating outlets in a co-rotating orientation.

Referring now to FIG. 5, in the preferred embodiment the outlet spacing ΔL is chosen such that relatively low momentum fluid swept out from the lower layers of the boundary layer by one said duct is not swept back into the lower layers of the boundary by the vortex generated by the adjacent outlet. In addition, the outlets must not be so far apart that their effect is reduced. In a particularly preferred embodiment the outlet spacing may be approximately 6 to 10 times the diameter of the jet orifices (for circular duct design) or 6 to 10 times the width of the jet orifices (for a rectangular duct design).

Figure 6A:
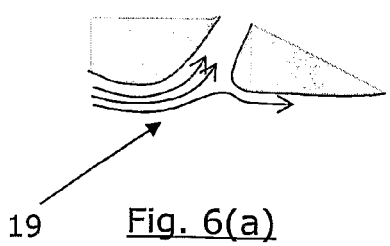
FIGS. 6(a) and (b) are schematic representations of differently contoured passive fluid jet vortex generating duct intakes.
Figure 6B:
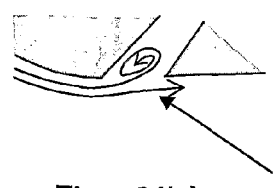

It is also preferred for the peripheral edges of the inlets 19 to be smoothly contoured, as shown in FIG. 6(a), rather than to include an abrupt change of direction as depicted in FIG. 6(b). The reason for this is that inlets with sharp edges may cause boundary layer separation to occur at the lip of the inlet, which separation would significantly reduce fluid flow into the duct, and hence the overall performance of the element.

As aforementioned, the teachings of the present invention are universally applicable to all types of fluid dynamic force generating elements irrespective of the fluid employed. For example the teachings of the present invention may be applied to aerofoil sections for fans, fixed or rotating wing aircraft or wind turbines where the fluid is air. Equally, the teachings of the present invention may be applied to hydrofoil sections for propellers, fluid turbines or foils for hydrofoil craft where the fluid is a liquid.

Figure 17:
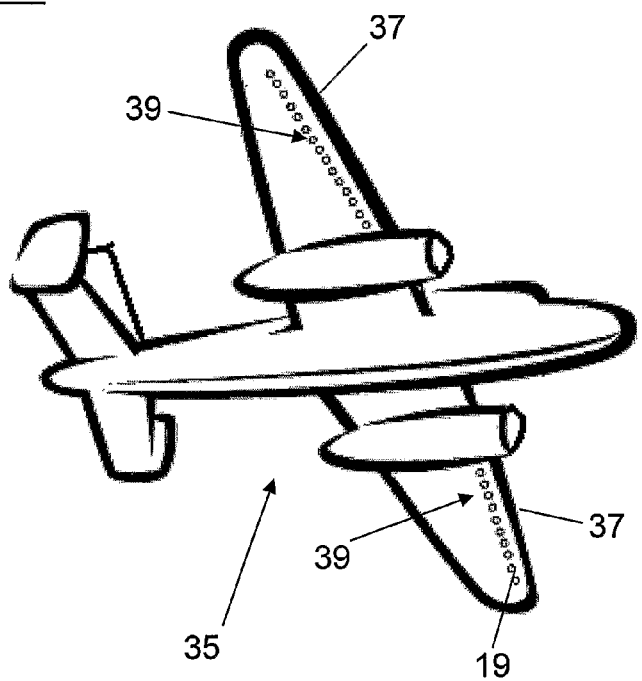
FIG. 17 is a schematic representation of a fixed wing aircraft showing the underside of each wing and passive fluid jet vortex generating inlet arrays.

FIG. 17 is a schematic illustrative representation of a fixed wing jet aircraft 35 wherein the wings 37 of the aircraft have each been modified in accordance with the teachings of the present invention to include an array 39 of passive fluid jet vortex generators, the inlets 19 of which are clearly visible on the underside of the wings 37. As will be appreciated by persons skilled in the art, the wings of such aircraft are typically manufactured by bolting or adhering or fusing together individual wing segments to form the finished wing structure.

Figure 18:
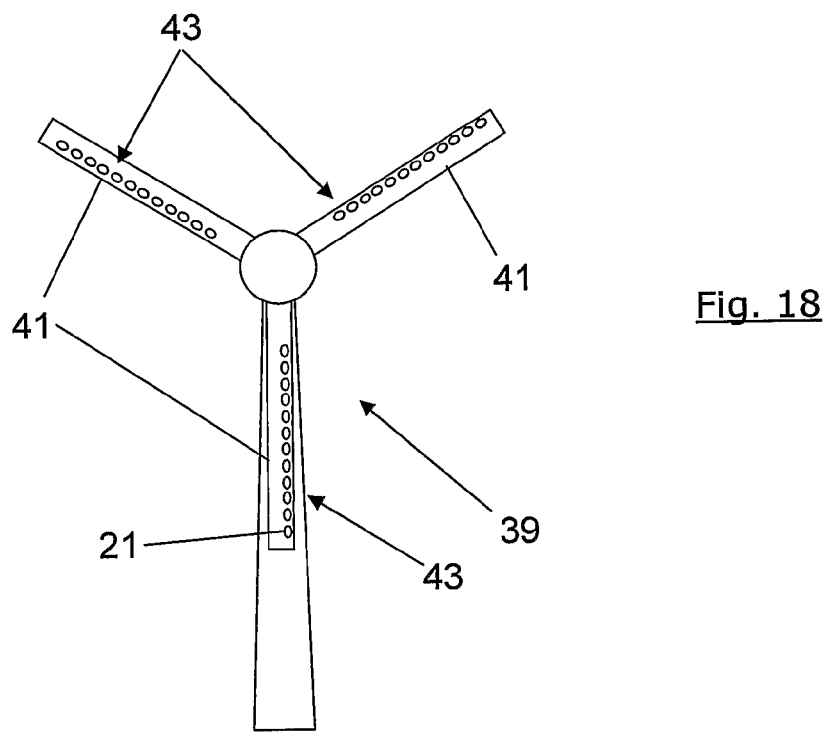
FIG. 18 is a schematic representation of a wind turbine showing an array of passive fluid jet vortex generating outlets on each blade.

FIG. 18 is a schematic elevation of an illustrative wind turbine 39 with three blades 41, each of which has been modified in accordance with the teachings of the present invention to include an array 43 of passive fluid jet vortex generators—the outlets 21 of which are clearly visible.

Figure 19:
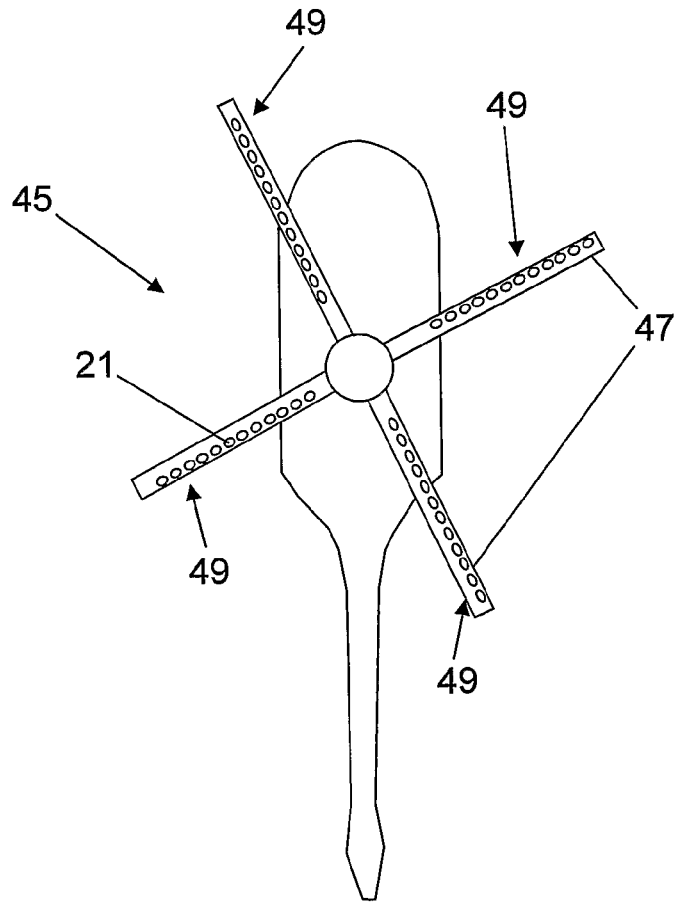
FIG. 19 is a schematic plan view of a rotating wing aircraft showing an array of passive fluid jet vortex generating outlets on each blade.

FIG. 19 is a schematic plan view of an illustrative rotating wing aircraft 45 to which the teachings of the present invention have been applied. The aircraft 45, in this instance a helicopter, includes four rotor blades 47 which each include an array 49 of passive fluid jet vortex generating devices, the outlets 21 of which are clearly visible.

The principles set out above have been verified in laboratory experiments for a variety of different aerofoil sections, and the following paragraphs set out those experimental findings for a representative sample of aerofoil sections. The results presented hereafter confirm the claimed benefits of our element, and have been obtained in experiments that can be repeated for the purposes of verification.

In the first instance we confirmed the veracity of our findings by conducting experiments on a static quasi-2D NACA23012C helicopter rotor blade section. The NACA23012C section is an aerofoil section that has been specially designed for research purposes and is typical of helicopter rotor blade sections. The NACA23012C section was first designed by Westland Helicopters in conjunction with Glasgow University.

The following results compare the lift and drag coefficients for a 0.74 m span, 0.481 m chord, segment of a NACA23012C section rotor blade, with and without (clean) an array of 15 passive fluid jet vortex generators (in this particular instance passive air jet vortex generators) devices positioned at x=12% chord. Quasi two-dimensional flow was imposed by applying end plates to the ends of the model to prevent the formation of tip vortices and the interference of relatively thick wind tunnel sidewall boundary layers. Lift and drag coefficients were calculated by the measurement and integration of i) the chordwise surface pressure distribution at three spanwise coordinates and ii) wake pressure measurements (using the Jones integration method to obtain drag).

Figure 7:
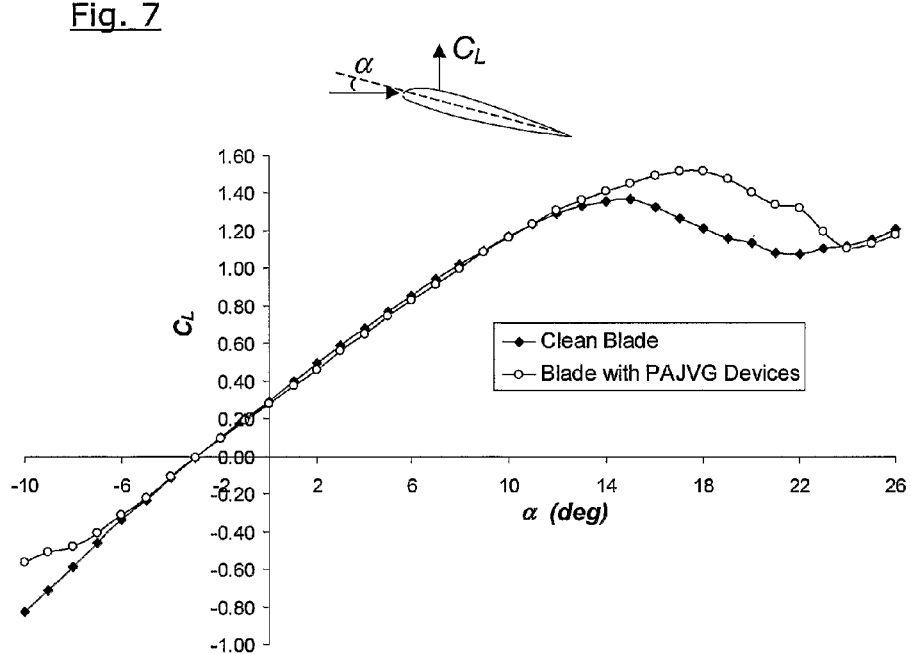
FIG. 7 is a graph of lift coefficient $C_L$ versus angle of attack a for a NACA23012C wind turbine blade section in a 35 m/s air flow (Reynolds number based on chord: $Re_C=1.1\times10^6$)

FIG. 7 is a graph depicting the variation of lift coefficient, $C_L$, with angle of attack, $\alpha$, for a constant uniform air speed of 35 m/s, with and without passive fluid jet vortex generators for a section with a Reynolds number based on chord ($Re_C$) of $1.1 \times 10^6$. As is clearly evident from FIG. 7, by adapting the element to include a plurality of devices of the type described herein the maximum lift coefficient $C_L$ may be increased by about 15% and full stall can be delayed from $\alpha=15°$ to $\alpha=18°$.

Figure 8:
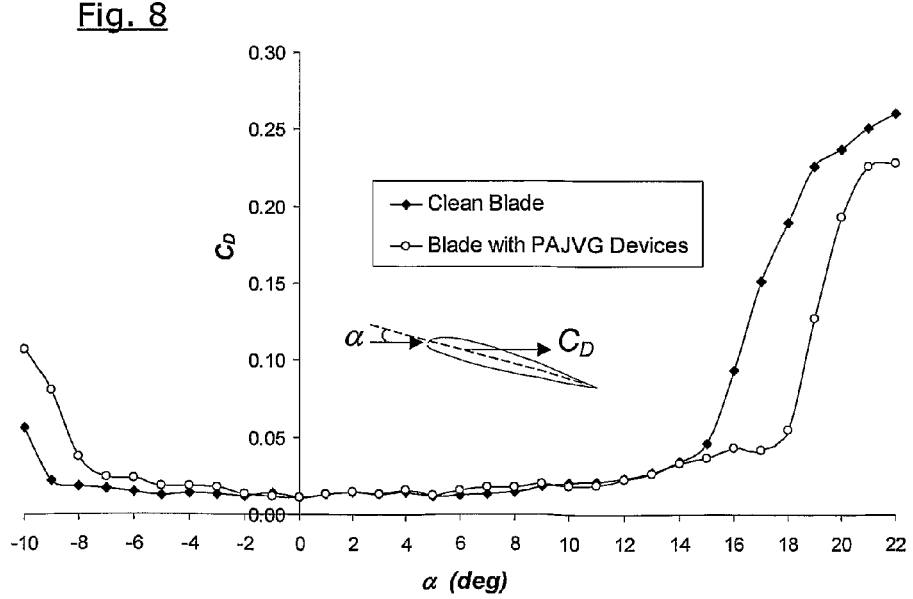
FIG. 8 is a graph of drag coefficient $C_D$ versus angle of attack a for a NACA23012C wind turbine blade section in a 35 m/s air flow ($Re_C=1.1\times10^6$)

FIG. 8 depicts the corresponding result for drag ($Re_C=1.1 \times 10^6$), calculated by employing the Jones wake pressure integration method. The two important results from these measurements are that i) there is no appreciable increase in drag for an element with PFJVG devices between 0° and 14° angle of attack and, ii) stall, indicated by the abrupt rise in drag, is suppressed from $\alpha=15°$ to 18°.

Figure 9:
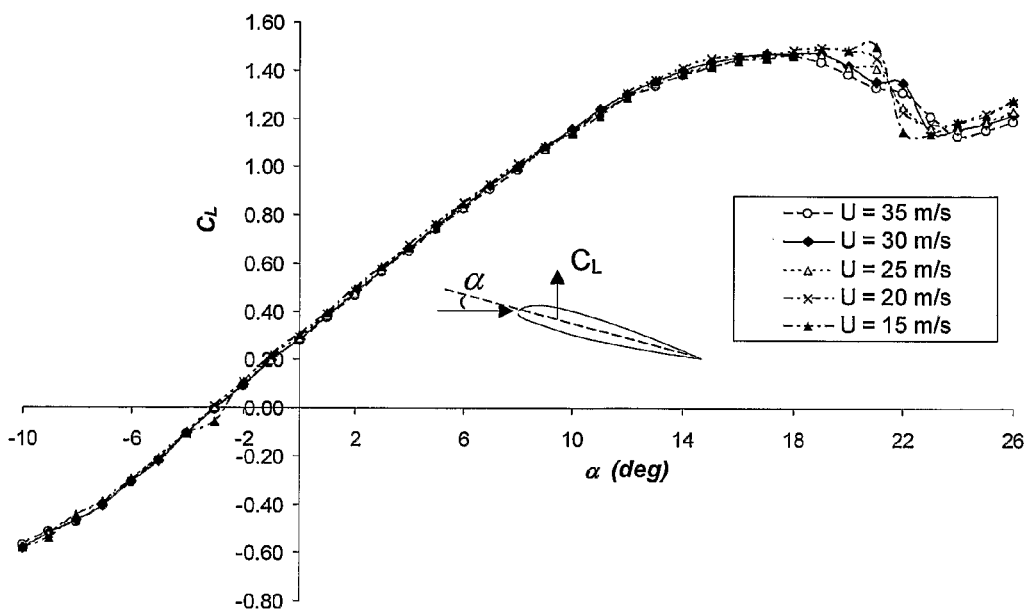
FIG. 9 is a graph of lift coefficient $C_L$ versus angle of attack a for a NACA23012C wind turbine blade section in a range of air flow speeds.

The effect of wind speed, and therefore the Reynolds number, was investigated by performing the experiments at wind speeds in the range of 15 to 35 m/s, corresponding to Reynolds numbers based on a chord of 0.481 m, of 0.49 to 1.13 million. FIG. 9 presents the variation of lift coefficient with angle of attack for a blade section with passive fluid jet vortex generating devices at five different wind speeds. The results depicted in FIG. 9 show that Reynolds number affects the stall, with more severe stalls taking place at lower wind speeds. The improved maximum $C_L$, and the delay in stall to a higher angle of attack, as compared to a clean blade, is universally apparent across the full wind speed/Reynolds number range.

The experimental dataset described above was employed with two blade element theory computer simulation codes, in order to assess the theoretical improvement in performance of a typical industrial wind turbine incorporating only the NACA23012C aerofoil section, with and without passive fluid jet vortex generating devices, along the entire span of the blade. These predictions provide an indication of the theoretical maximum improvement in wind turbine performance for a given rotor rotational speed, across a range of wind speeds.

This analysis was performed using an industry standard, publicly available, wind turbine performance computer code (available from http://wind.nrel.gov/designcodes/simulators/wtperf/), developed by the US National Wind Technology Laboratory (part of the US National Renewable Energy Laboratory (NREL)) near Boulder, Colo.; and a similar code developed by the inventors. Both prediction codes implemented classic Blade Element Momentum Theory, but the NREL code includes more advanced modelling to take into account spanwise 3D effects and dynamic stall and interference pressure losses. Both codes were given the experimental $C_L$ and $C_D$ versus a data from the experimental measurements as inputs.

Figure 10:
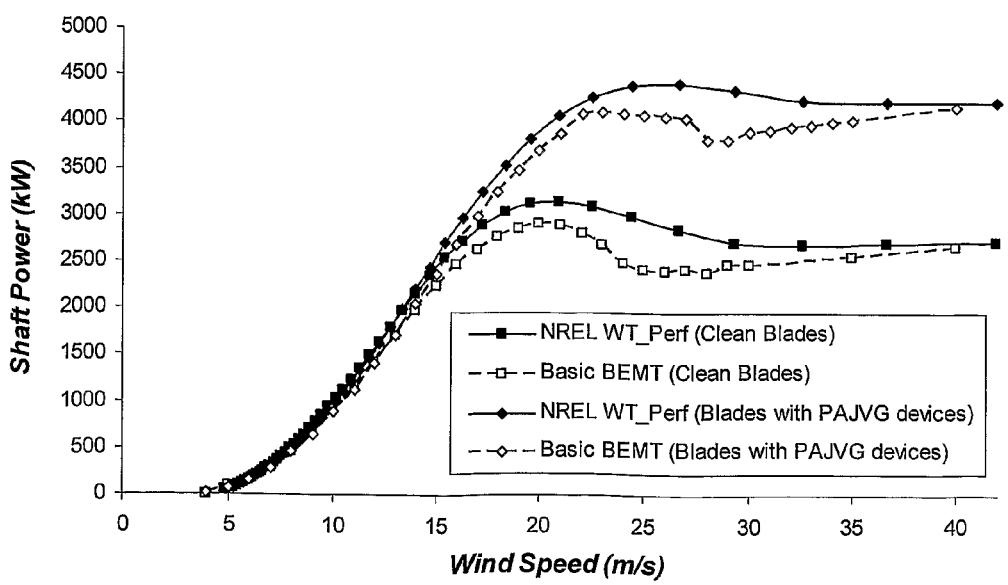
FIG. 10 is a graph depicting theoretical power curves for a WindPACT 1.5MW wind turbine using blades with the NACA23012C wind turbine blade section, with and without passive fluid jet vortex generating devices.

FIG. 10 depicts the predicted power curves (wind speed versus shaft power) for the case of a WindPACT (Wind Partnerships for Advanced Component Technology) 1.5MW wind turbine (using the same blade chord and twist distribution provided with the NREL code as a standard test case), with a rotor speed of 20 revolutions per minute and rotors with and without passive fluid jet vortex generating devices. This WindPACT turbine is available from the National Wind Technology Laboratory aforementioned.

As is clearly visible from FIG. 10, the analysis shows that employing passive fluid jet vortex generator devices along the length of the WindPACT 1.5MW rotor blades, employing the NACA23012C aerofoil section along their whole span, provides a considerable theoretical increase in the shaft power output for wind speeds above 15 m/s, and modest increases below this wind speed. While the actual achievable improvements may be less than this theoretical maximum case, it is nevertheless the case that significant performance improvements are expected by incorporating passive fluid jet vortex generators of the type aforementioned.

In the second instance we conducted experiments on a static quasi-2D NACA $63_2217$ wind turbine rotor blade section. The NACA (National Advisory Committee for Aeronautics) is the forerunner of NASA and has defined a series of standard aerofoil section shapes, of which this is one.

This second set of wind tunnel experiments was performed to measure the effects of applying passive fluid jet vortex generator devices to a much thicker aerofoil section typical of industrial wind turbine blades over a wind speed range of 5 m/s to 25 m/s.

An inboard section of a decommissioned Aerolaminates Ltd. (St Cross Business Park, Newport, Isle of Wight, United Kingdom) industrial wind turbine blade was modified to incorporate an array of passive fluid jet vortex generating devices. The 0.98 m span section employed a NACA 632217 aerofoil with a slightly modified (cambered) trailing edge, and used end plates to enforce quasi-2D flow. The chord varied between a maximum of 0.86 m at the inboard end, to 0.79 m at the outboard end, whereby the trailing edge was swept back while the leading edge remained roughly unswept. The passive fluid jet vortex generator outlets and ducts were of circular cross-section for simplicity, with a diameter of 10 mm, and the jet exits, which were pitched at 30° to the local surface tangent and skewed outboard by 57° to the freestream flow direction, were located 80 mm apart such that the passive fluid jet vortex generator array comprised 10 jets, at a chordwise location of x/c=0.12.

Figure 11:
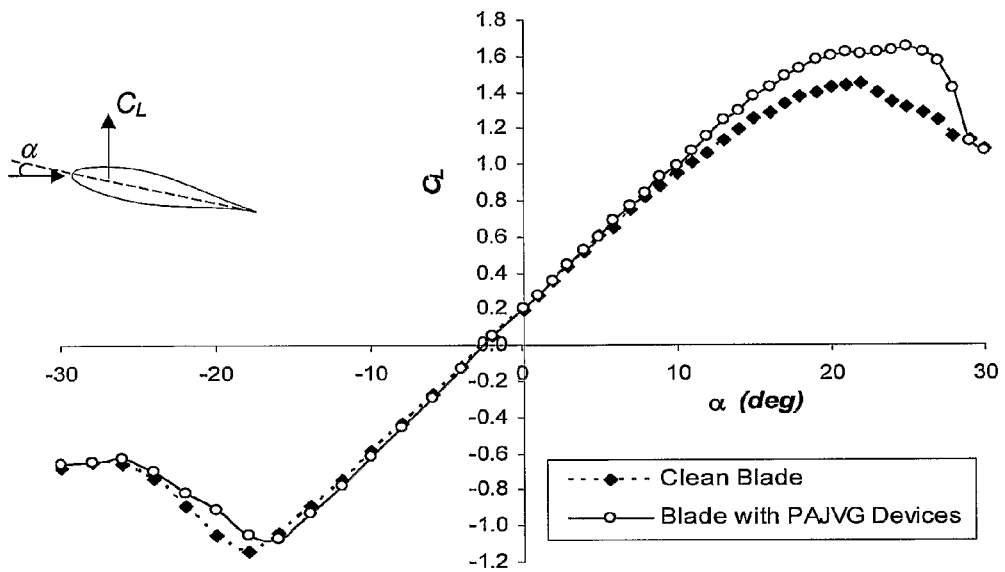
FIG. 11 is a graph of lift coefficient $C_L$ versus angle of attack a for a modified NACA 632217 blade section in a 25 m/s air flow ($Re_C=1.4\times10^6$)

FIG. 11 depicts the measured variation of lift coefficient, $C_L$, with angle of attack, $\alpha$, for a 25 m/s wind speed ($Re_C=1.4 \times 10^6$). The performance improvement, employing passive air jet vortex generators can clearly be seen above $\alpha=10°$. The results demonstrate the same effects as seen in the experiments with the NACA23012C experiments, namely i) an increased maximum $C_L$ and ii) a stronger stall event, delayed to a higher angle of attack. The variation of drag coefficient over the angle of attack range investigated also showed the same trends as plotted for the NACA23012C aerofoil section.

Figure 12:
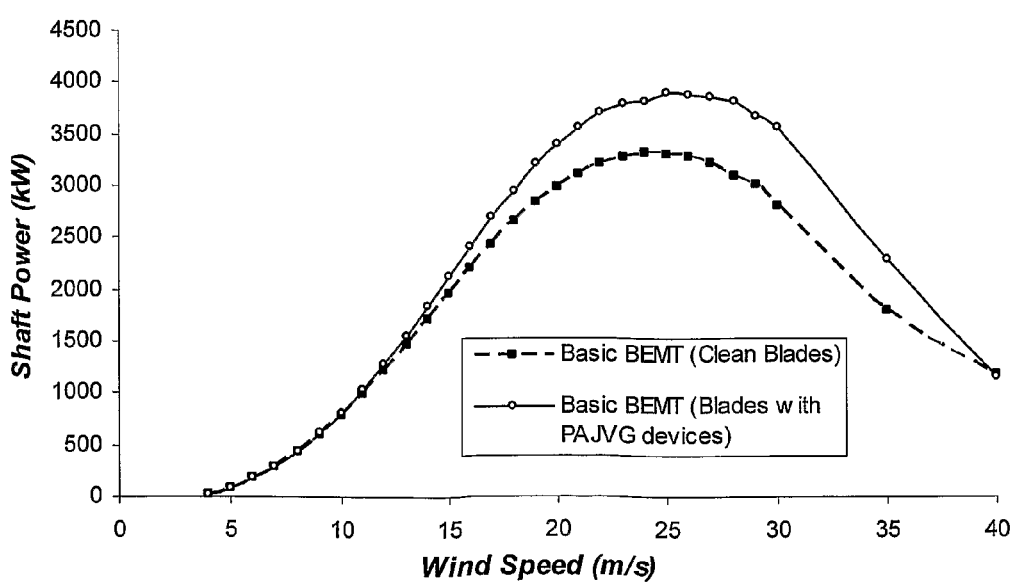
FIG. 12 is a graph depicting theoretical power curves for a WindPACT 1.5MW wind turbine using blades with the modified NACA $63_2217$ section, with and without passive fluid jet vortex generating devices.

The data for the modified NACA 632217 experiments was input into our Blade Element Momentum theory (BEMT) code to simulate the aerodynamic performance of the WindPACT 1.5MW wind turbine. This assumed the same blade design but employing the modified NACA 632217 aerofoil along the entire span of the blade, with and without passive air jet vortex generators. The rotor speed was again set at a constant 20 rpm. FIG. 12 shows that above about 13 m/s wind speed, significant shaft power increases are theoretically achievable by use of passive fluid jet vortex generators.

In the third instance we conducted experiments on a static Eclectic Energy D400 Domestic Wind Turbine Rotor Blade available from Eclectic Energy Limited, Edwinstowe House, High Street, Edwinstowe, Nottinghamshire, United Kingdom. NG21 9PR.

The blade, of span 0.5 m, was mounted statically in our wind tunnel and connected to a 6-component force/moment balance. The blade was tested, unmodified, and with an array of passive fluid jet vortex generators. The PFJVG array was located such that the outlets (from a 2 mm diameter duct) were on an x/c=0.15 line along the span of the blade. The array consisted of 26 devices, each pitched at 30° to the local surface tangent and skewed 60° inboard.

Forces and moments were measured at 15, 20, 25, 30 and 35 m/s wind speed while the angle of the attack was varied between −30 and +30 degrees with measurements taken at every 1° increment. Zero degree angle of attack was defined as when the section of the blade tip was set at 0° to the freestream air flow. When mounted on the turbine hub, the blades are set at a tip pitch angle of approximately 12 to 15°. The experiments were performed without any shroud around the blade root mounting lug, but interference caused by this component is common to all sets of results.

Figure 13:
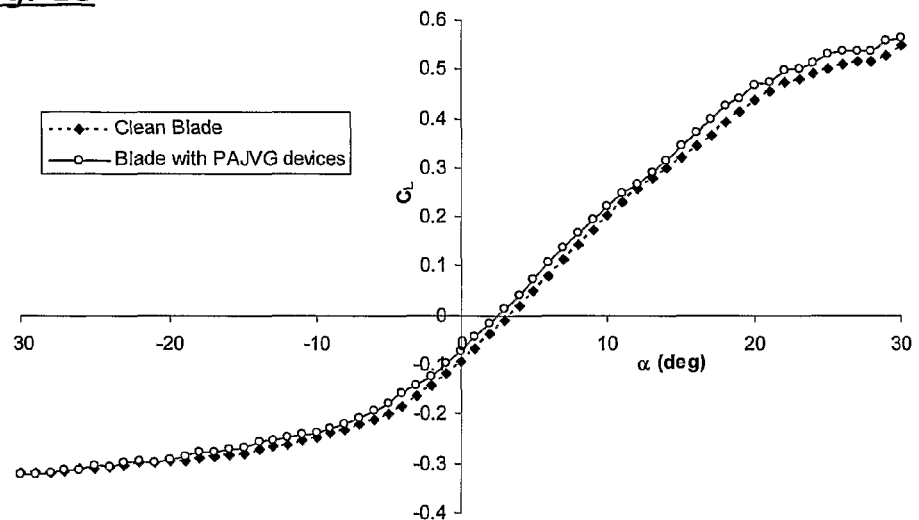
FIG. 13 is a graph of lift coefficient $C_L$ versus angle of attack a for a static Eclectic Energy D400 wind turbine blade in a 35 m/s air flow.
Figure 14:
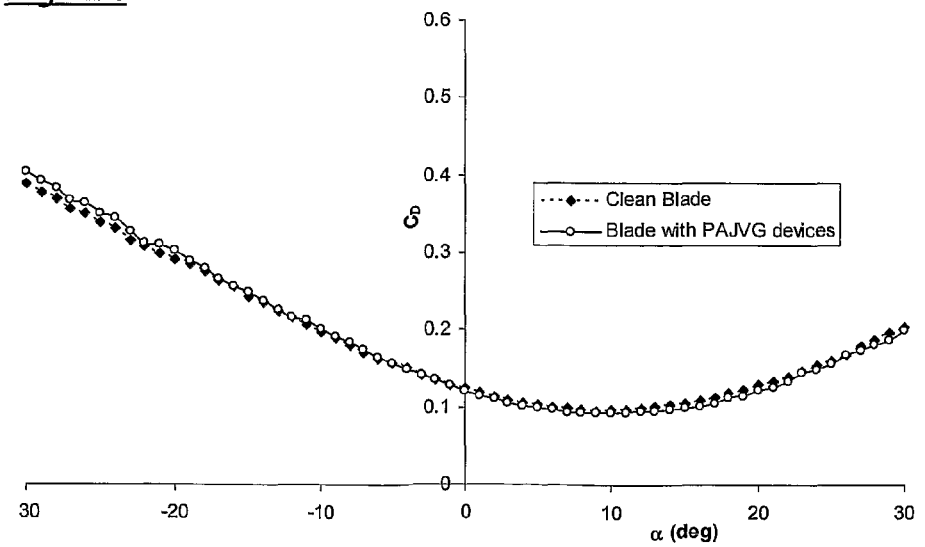
FIG. 14 is a graph of drag coefficient $C_D$ versus angle of attack a for a static Eclectic Energy D400 wind turbine blade in a 35 m/s air flow.
Figure 15:
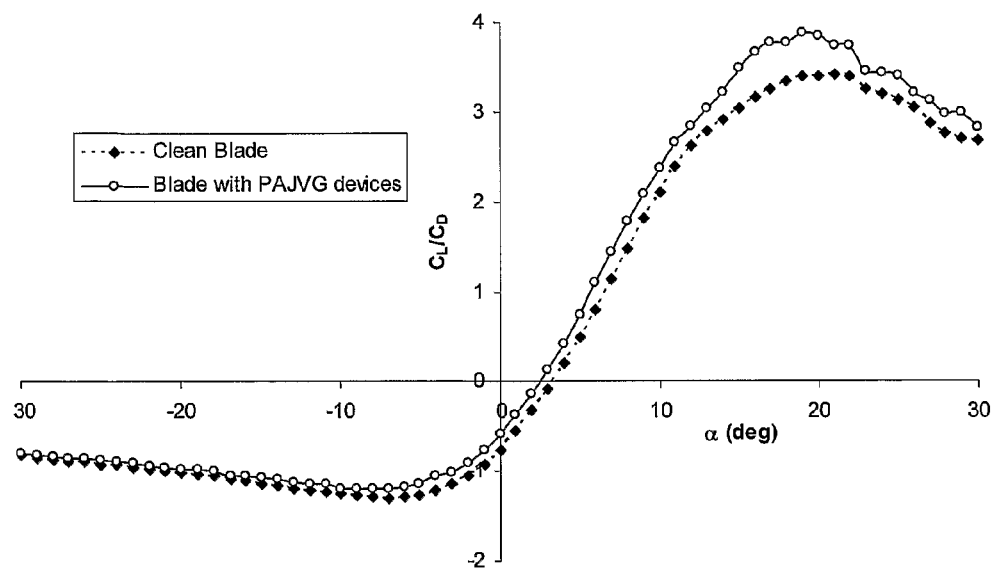
FIG. 15 is a graph of Lift to Drag Ratio ($C_L/C_D$) versus angle of attack a for a static Eclectic Energy D400 wind turbine blade in a 35 m/s air flow.

The graphs shown in FIG. 13 to 15 present a selection of the results for 35 m/s wind speed, which is representative of the results at all of the wind speeds tested. FIGS. 13 and 14 respectively depict the variation of lift coefficient, $C_L$, and drag coefficient, $C_D$, with angle of attack α, and FIG. 15 depicts lift to drag ratio, $C_L/C_D$, which is a measure of the "efficiency" of fluid dynamic force generating components.

The results clearly show that the addition of passive fluid jet vortex generating devices of the type described herein increased the lift coefficient, for a given angle of attack, by between 3 to 47% over the positive angle of attack range. The drag coefficient, for a given angle of attack, was found to be reduced by between 0.35% to 6.7% using the teachings of the present invention, over the positive angle of attack range. These results equate to an increase in the lift to drag ratio of between 5-50%.

In a final set of experiments, we investigated the performance of a full domestic wind turbine both with and without passive fluid jet vortex generators of the type described herein. The turbine we chose was the Aero4Gen-F 12 volt domestic wind turbine, manufactured by LVM Ltd (Old Oak Close, Arlesey, Bedfordshire SG15 6XD, United Kingdom), and the turbine was mounted in our Industrial Wind Tunnel. The turbine head was modified to incorporate air cooling of the generator coil, to limit temperature-related electrical resistance variations. The generator was connected to a 2 ohm resistor load, which was attached to the mounting tower such that it was cooled by the wind tunnel air stream. The experiment was, therefore, designed to limit the effect of electrical heating.

The Aero4Gen-F is designed to furl (rotate about its vertical axis away from the oncoming wind direction) as a means f regulating rotor rotational speed and hence power output. In our tests, the Aero4Gen-F was fixed so that it would not furl. This allowed a fair test of the rotor aerodynamics, without interference caused by furling.

The Aero4Gen wind turbine was tested with its clean, unmodified blades, and also with the same blades with a spanwise array of 16 passive fluid vortex generating devices incorporated into them. The individual passive fluid vortex generating devices consisted of 1.5 mm diameter channels set at 30° pitch angle to the local upper surface tangent, and at 60° skew angle (inboard towards the hub) to the oncoming freestream wind vector. The jet intakes were rounded, with a 1 mm chamfer, and the array of passive fluid vortex generating devices was located such that the jet orifices, on the upper surface, lay on the 15% chord line.

The experiments were performed by increasing the tunnel wind speed steadily from 0 m/s up to a maximum of 14 m/s, before reducing the wind speed back down to zero again. The tunnel wind speed, turbine rotational speed, and the electrical power output from the turbine generator were all measured and recorded, after 15 seconds after each wind speed change in order to achieve steady state conditions. The resulting power curves (electrical power generated versus wind speed) are plotted in FIG. 16.

Figure 16:
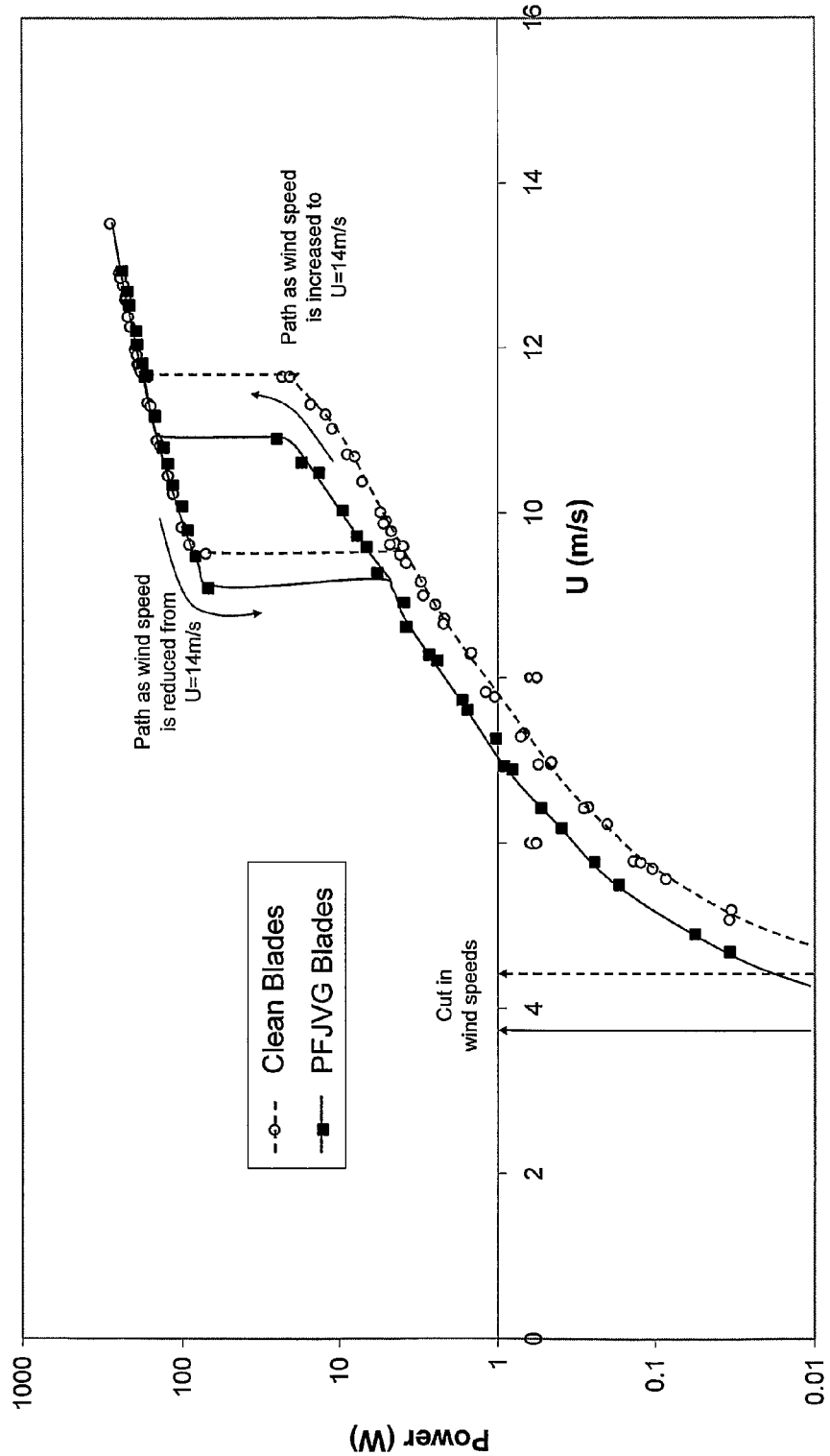
FIG. 16 is a graph of electrical power output versus wind speed for an LVM Aero4Gen wind turbine with clean blades and with blades incorporating passive fluid vortex jet generating devices.

Referring now to FIG. 16, as the wind speed is increased from 0 m/s the wind turbine with clean blades began to turn at a (cut-in) wind speed of about 4.4 m/s, whereas the turbine with blades incorporating passive fluid jet vortex generating devices began turning at 3.8 m/s. This demonstrates that our passive fluid jet vortex generating devices can provide for electrical power output at lower wind speeds.

FIG. 16 also shows that for a given wind speed up to about 11 m/s, for this particular wind turbine, use of passive fluid jet vortex generating devices consistently provides significantly increased power output. For example, at 8 m/s wind speed the turbine with blades incorporating passive fluid jet vortex generating devices provides a 40% increase in power output as compared to the turbine with clean blades, and at 11 m/s wind speed the power output is more than doubled.

This increased power output is due to the stall suppression effects of the passive fluid jet vortex generating devices at lower wind speeds. At higher wind speeds, where maximum power output is achieved, the increased rotational speeds cause the reattachment of the blade upper surface boundary layers, so that both clean and modified blades both perform identically.

An important feature of FIG. 16 is that the power output from the turbine as the wind speed is increased from zero follows a different path as that when the wind speed is decreased from maximum. Discontinuous jumps in power output are seen at different wind speeds on the increasing and the decreasing wind speed paths. These are due to the occurrence of boundary layer separation at the lower rotational speeds, and its reattachment at higher rotational speeds. It can be seen that passive fluid jet vortex generating devices promote an earlier jump in power output with increasing wind speed, due to their capability to reattach separated boundary layers at lower wind speeds. In addition passive fluid jet vortex generating devices are also seen to help sustain the attached boundary layer, as the wind speed is reduced, denoted by a later drop in power output compared with the clean blade result.

In summary, it has been clearly demonstrated that passive fluid jet vortex generating devices can reduce the cut-in wind speed of a typical domestic wind turbine, and significantly improve its power generation capabilities.

It is apparent from the foregoing that the teachings of the present invention provide an effective means to improve the performance of fluid dynamic force generating elements without adversely increasing the drag of those elements.

It will also be apparent to persons of ordinary skill in the art that whilst certain presently preferred embodiments of the present invention have been described herein, the scope of the present invention is not limited to those embodiments. Many modifications and alterations may be made to the illustrative embodiments described herein without departing from the spirit and scope of the present invention defined by the accompanying claims.

The invention claimed is:

1. An element for generating a fluid dynamic force, the element comprising,
first and second surfaces extending in opposite directions from a leading edge and meeting at a trailing edge thereof to define a three dimensional body that is shaped to generate a fluid dynamic force when immersed at an angle of attack α to a fluid flow over the body in a flow direction U, the first surface having an array of fluid inlets and the second surface having a corresponding array of fluid outlets, each said inlets being fluidly coupled to one of the outlets by means of a fluid duct at least part of which is pitched at an angle θ to a tangent plane to said second surface in the vicinity of said outlet and skewed at an angle φ to said fluid flow direction U, the arrangement being such that the body is operable in use to generate a relatively high fluid pressure region downstream of said leading edge proximate said first surface and a relatively low fluid pressure region downstream of said leading edge proximate said second surface, and fluid from said relatively high fluid pressure region is enabled to flow into said fluid inlets through said fluid ducts and out of said fluid outlets into said relatively low pressure region to generate fluid vortices which reenergise said low pressure region and delay boundary layer separation from said second surface.

2. An element according to claim 1, wherein said inlets have a larger cross-sectional area than said outlets, and said fluid ducts decrease in cross-sectional area from a said inlet to a said outlet to accelerate fluid flowing therethrough.

3. An element according to claim 1, wherein said pitch angle θ is between about 15° to 45°, preferably approximately 30°.

4. An element according to claim 1, wherein said skew angle φ is between about 30° to 90°, preferably between 60° to 70°.

5. An element according to claim 4, wherein said skew angle is in an inboard direction away from a tip of the element.

6. An element according claim 1, wherein the element has a length, and said outlet array is arranged to follow a spanwise line along the length of the element.

7. An element according to claim 6, wherein a ratio at discrete locations along said length of a distance x between said leading edge and a spanwise line and a distance C corresponding to the width is substantially constant along the length of the body.

8. An element according to claim 7, wherein said ratio x/C is greater than zero and less than 0.4

9. An element according to claim 1, wherein said fluid flows out of said outlets as a plurality of fluid jets.

10. An element according to claim 9, wherein respective pairs of inlets, outlets and ducts are arranged such that fluid jets emerging therefrom form counter-rotating fluid vortices.

11. An element according to claim 9, wherein said inlets, outlets and ducts are arranged such that fluid jets emerging therefrom form co-rotating fluid vortices.

12. An element according to claim 1, wherein said inlets, outlets and said ducts have a circular, elliptical, square or rectangular cross-section.

13. An element according to claim 12, wherein said inlets, outlets and said ducts have a circular cross-section, and adjacent outlets are spaced by a distance ΔL substantially equal to between 6 to 10 times each outlet diameter.

14. An element according to claim 13, wherein said inlets, outlets and ducts have a circular cross-section, and each outlet has a diameter substantially equal to about 0.5 to 1.0 times a height of a local undisturbed boundary layer thickness.

15. An element according to claim 13, wherein said inlets, outlets and ducts have a square or rectangular cross-section, and adjacent outlets are spaced by a distance ΔL substantially equal to between 6 to 10 times a longest side of each said outlet.

16. An element according to claim 13, wherein said inlets, outlets and ducts have a square or rectangular cross-section, and each outlet has a width or longest side that is substantially equal to about 0.5 to 1.0 times a height of a local undisturbed boundary layer thickness.

17. An element according to claim 1, wherein said body has a length, and said inlets are located to coincide with the location of a notional stagnation line along the length of the first surface.

18. An element according to claim 17, wherein said stagnation line corresponds to a point of greatest static fluid pressure on said first surface at a particular angle of attack α at which boundary layer separation on said second surface begins to progress upstream towards said leading edge.

19. An element according to claim 1, wherein said ducts include a non-return valve to prevent fluid flow into said outlets through said ducts and out of said inlets.

20. An element according to claim 1, wherein one or more of said ducts include a swirl generator to induce a pre-swirl in fluid passing therethrough.

21. The element of claim 1 wherein said body is an aircraft wing or wing section or a flap or a slat.

22. The element of claim 1 wherein said body is replicated in a wind turbine wherein the replicated bodies form a plurality of blades.

23. The element of claim 1 wherein said body is a rotor blade for a rotating wing aircraft such as a helicopter.

24. An element configured for use as a wing or wing section of a fixed wing aircraft, a blade for a wind turbine, or a rotor blade for a rotating wing aircraft; the element having a length and a width C and comprising:
first and second surfaces extending in opposite directions from a leading edge of the element and meeting at a trailing edge thereof to define a three dimensional body that is shaped to generate a fluid dynamic force when immersed at an angle of attack α to a fluid flow over the element in a flow direction U;
said first surface comprising an array of fluid inlets located to coincide with a notional stagnation line along the length of the element first surface,
said second surface comprising a corresponding array of fluid outlets which is arranged to follow a spanwise line (J-J) along the length of the body, a ratio at discrete locations along said length of a distance x between said leading edge and said spanwise line (J-J) and a distance C corresponding to the width of the element being substantially constant along the length of the body,
each said inlet being fluidly coupled to a said outlet by means of a fluid duct pitched at an angle θ between about 15° to 45° to a tangent plane (Y-Y) to said second surface in the vicinity of said outlet and skewed at an angle φ between about 30° to 90° to said fluid flow direction U, said fluid duct decreasing in cross-sectional area from said inlet to said outlet to accelerate fluid flowing therethrough;
the arrangement being such that the body is operable in use to generate a relatively high fluid pressure region downstream of said leading edge proximate said first surface and a relatively low fluid pressure region downstream of said leading edge proximate said second surface, and fluid from said relatively high fluid pressure region is enabled to flow into said fluid inlets through said fluid ducts and out of said fluid outlets into said relatively low pressure region to generate a plurality of co-rotating fluid vortices which reenergise said low pressure region and delay boundary layer separation from said second surface.

25. A hydro- or aero-dynamic body operable in use to generate a region of high fluid pressure adjacent a first surface and a region of low fluid pressure adjacent a second surface when said body is arranged at an angle of attack to an incident fluid flow; the body comprising, a plurality of ducts, pitched and skewed relative to said fluid flow, extending from said high pressure surface to said low pressure surface to enable the formation of a plurality of fluid jets extending from said ducts to form fluid vortices that reenergise said low pressure region and delay boundary layer separation from said low pressure surface.

* * * * *